June 5, 1956  E. COLLAT  2,748,781
MEANS FOR DENTAL HYGIENE
Filed Aug. 24, 1953

Edgar Collat
INVENTOR.

United States Patent Office 2,748,781
Patented June 5, 1956

2,748,781

MEANS FOR DENTAL HYGIENE

Edgar Collat, Milwaukee, Wis.

Application August 24, 1953, Serial No. 376,127

4 Claims. (Cl. 132—93)

This invention relates to means for dental hygiene, and more particularly to a novel form of dental cord or tape for use in fortifying teeth against decay and the formation of cavities.

Conventional care for teeth and gums consists of the use of a tooth brush and the application of a cleansing medium thereon, which leaves much to be desired. Food particles which are not dislodged by brushing and which remain at or near gum areas will cause, by fermentation and bacterial action, a softening and soreness of the gums frequently accompanied by bleeding as well as the disintegration and erosion of adjacent dental surfaces. Cavities are one result of such bacterial action.

Even the most careful brushing technique does not dislodge particles of food from some crevices or constricted contiguous tooth and gum areas and it is in such circumstances as well as for use undereneath certain bridges and dentures that a dental floss or dental tape will remove these undesirable organic masses.

The object of my invention is to provide a self-sufficient, practical, simple and inexpensive means which is easily portable and which may be used anywhere to achieve a positive cleanliness and an improvement in local asepsis in oral areas where tooth decay and gum disturbances are most prevalent.

A further object of the present invention is to provide a cord or tape consisting of fibers suitable for dental usage and which have been properly conditioned and treated, on which is applied an aqueously soluble decay-inhibiting and germicidal mixture having a low surface tension to permit rapid diffusion in the saliva film on and around the teeth and gums.

A still further object of this invention is to provide a cord or tape for dental usage which has a multiple-purpose adhesive whose function is to firmly bond together the fibers forming the cord into a desired contour and to securely adhere the thus formed tape or cord onto a flexible strip or backing material as well as to retain and hold the decay-preventing material onto the adhesively treated cord.

These objects are accomplished by the arrangement and materials hereinafter described and embodiments of the invention are shown in the accompanying drawings in which—

Figure 1:
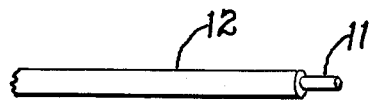
Figure 1 is a perspective view of one form of the invention.

Referring in detail to Figure 1 it will be seen that a cord, or strand of floss, or other suitable flexible material 11, is coated as indicated at 12. This coated cord or floss may be used in the form shown in Figure 1 and may be merely wound on a spool or other dispensing member not illustrated.

Figure 2:
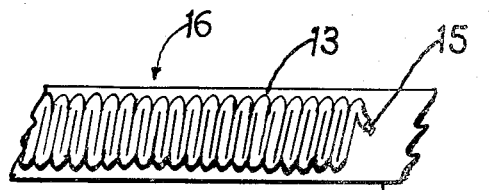
Figure 2 is a perspective view showing another form of the invention partly constructed.

In the form of the invention shown in Figure 2 the same cord or floss shown in Figure 1 is illustrated at 13 and it will be seen that such cord or floss is laid on a cellophane or other plastic tape 14, the cord or fiber itself is indicated by the reference character 15. The completed tape is indicated generally in its entirety by the reference character 16. This completed tape is wound in its finished form into a roll indicated by the reference character 17 in Figure 3.

An essential feature of this invention is to impregnate the filaments, fibers, floss, or fibrous tape itself if such is used, with an adhesive material which performs a number of different functions.

The bonding of the fibers or filaments is made possible by the application of a conventional non-toxic adhesive which preferably remains somewhat "tacky," or sticky to the touch, within temperature ranges common to human habitation.

In the form of the invention shown in Figure 1 the adhesive contains the decay-preventing material and this coating is merely applied to the fibers, cord or fibrous tape 11 and it is allowed to attain its final consistency before the coated fibers are wound on a spool or other dispensing member.

In the form of the invention shown in Figure 2 the adhesive treated fibers are adhered to a flexible strip and formed thereon in a manner that will permit great lengths of the treated fibers to be assembled and subsequently coated on a relatively short length of flexible backing strip. It will be seen that the adhered fibers, shaped into contour of tape or cord are imposed and adhered upon the surface of a flexible strip and compactly arranged by forming a continuous series of transversely alternating loops. The upper surface of these adhered fibers is then coated with a powdered mixture of the various chemicals subsequently described. Suitable lengths of the ensemble may be cut off as desired and the coated cord easily removed from the plastic tape, and used between the teeth as desired.

Figure 3:
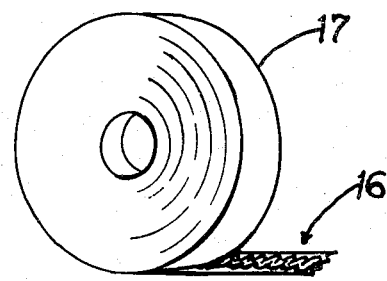
Figure 3 shows the form of the invention as it would be dispensed in trade.

A convenient way of protecting the invention is shown in Figure 3. After the process has arrived at the above described point the tape is rolled into a desired length, or suitably sized roll as indicated at 17 in Figure 3. This rolled tape, it will be seen, has the plastic as a protective medium covering the unused portion of the coated fibers. The flexible mounting functions as a convenience in assembly, packing, transportation, and assures cleanliness as well as protection for the coated fibers.

The chemical coating consists of ammonium chloride, sodium fluoride, sodium laurate, zinc chloride and sodium perborate, which mixture, properly proportioned, may be either dissolved in the adhesive, or may be sprayed or dusted onto the adhesively treated surface. The ammonium and fluorine ions have been found to be very effective in reducing the formation of cavities. Sodium laurate lowers the surface tension, to make possible the widest penetration of the chemical mixture. The astringent zinc chloride will "tone" and harden the gums while the sodium perborate germicide will destroy any bacterial remnants on the tooth surfaces.

Various chemical compounds may be substituted for the individual items described above as, for instance, a derivative of iodoform, that is relatively without odor, and termed "vioform," may be substituted for the germicidal sodium perborate. Similarly, diethylene glycol may replace the sodium laurate as the surface tension reducer, etc.

The decay-preventing and therapeutic mixture described is held within non-toxic limits and the chemicals named herein are merely given as examples, and shall not serve to limit the invention in any sense.

The term "cord" is intended to cover a cord, filament, floss or tape or other fibrous strands and is used for simplicity in claiming to avoid a needless repetition of terms or expressions.

Thus the combination of the chemical mixture, with the suitable cord, and the multiple-purpose adhesive, will produce a dental cord or tape that is a novel improvement in structure as well as purpose.

Although this invention has been described in considerable detail it is to be understood that such description is not intended as limiting but is merely illustrative and the invention is to be limited only as claimed.

I claim:

1. In a device of the class described an assembly comprising suitable fibers impregnated with a non-toxic adhesive holding said fibers in desired contour, binding the formed fibers securely to a flexible backing strip and retaining a coating of powdered commercial dentifrice, said assembly wound into a compact roll and successive convolutions of said flexible backing strip protecting and temporarily sealing the coated fibers against contamination.

2. A dental cord for cleaning teeth, comprising fibrous strands adhesively bonded and fashioned into a desired cross section said adhesive holding said cord to a flexible backing strip, and also retaining on the upper surface of said fibers a coating of a commercial dentifrice.

3. A dental cord for cleaning teeth comprising an elongated fibrous strand treated with a multipurpose adhesive, holding said cord into the desired contour, adhesively bonding said cord to a flexible backing strip, the upper surface of said treated cord capable of firmly adhering a layer of a commercial tooth paste.

4. In a device of the class described an assembly comprising suitable fibers impregnated with a non-toxic adhesive for the purpose of holding said fibers in desired contour, binding the formed fibers securely to a flexible backing strip and adhering an incrustation of powdered commercial dentifrice, said assembly formed onto a flexible backing strip, capable of being folded compactly, to protect and temporarily seal the coated fibers against contamination.

References Cited in the file of this patent

UNITED STATES PATENTS

| | | |
|---|---|---|
| 407,362 | Mason | July 23, 1889 |
| 1,069,874 | Hanscom | Aug. 12, 1913 |
| 1,138,479 | Hough | May 4, 1915 |
| 1,839,486 | Lawton | Jan. 5, 1932 |
| 1,943,856 | Cross | Jan. 16, 1934 |
| 1,989,895 | Van Gilder | Feb. 5, 1935 |
| 2,542,518 | Henschel | Feb. 20, 1951 |
| 2,554,464 | Kravs | May 22, 1951 |
| 2,667,443 | Ashton | Jan. 26, 1954 |